United States Patent [19]

Tamura

[11] Patent Number: 4,781,258
[45] Date of Patent: Nov. 1, 1988

[54] REAR FENDER APPARATUS IN SADDLE TYPE VEHICLE

[75] Inventor: Gen Tamura, Kokubunji, Japan

[73] Assignee: Honda Giken Kogyo Kabushiki Kaisha, Tokyo, Japan

[21] Appl. No.: 886,475

[22] Filed: Jul. 17, 1986

[30] Foreign Application Priority Data

Jul. 17, 1985 [JP] Japan ................................ 60-156148

[51] Int. Cl.$^4$ ...................... B60K 11/04; B62M 7/06
[52] U.S. Cl. ................................. 180/68.1; 180/229
[58] Field of Search ............... 180/210, 215, 219, 229, 180/7.3, 7.4, 65.3, 68.1, 68.2; 296/1 S, 198, 208; 280/152 A, 152 R, 153 A, 154.5 R, 154.5 A

[56] References Cited

U.S. PATENT DOCUMENTS

| | | | |
|---|---|---|---|
| 4,392,536 | 7/1983 | Iwai et al. ............................ | 180/217 |
| 4,475,616 | 10/1984 | Yamazaki et al. ................... | 180/215 |
| 4,535,869 | 8/1985 | Tsutsumikoshi et al. ............ | 180/311 |
| 4,577,720 | 3/1986 | Hamane et al. ...................... | 180/229 |

FOREIGN PATENT DOCUMENTS 56-73694  6/1981  Japan.
60-37430  3/1985  Japan.

Primary Examiner—John J. Love
Attorney, Agent, or Firm—Armstrong, Nikaido, Marmelstein & Kubovcik

[57] ABSTRACT

A fender apparatus for use with a saddle type vehicle having a vehicle body, an internal combustion engine mounted on the vehicle body, a driver's seat mounted on the vehicle body and a pair of rear wheels mounted on the vehicle body. The fender apparatus comprises a rear fender having a downwardly bent front wall located to the inside of the position of the rear wheel on each side of the vehicle body, such that air flows rearward past the engine and through the through openings to dissipate heat generated by the engine.

2 Claims, 1 Drawing Sheet

REAR FENDER APPARATUS IN SADDLE TYPE VEHICLE

BACKGROUND OF THE INVENTION

1. Field of the Invention

This invention relates to a rear fender apparatus for use with a saddle type vehicle of three-wheels, four-wheels or the like in which the vehicle body has an internal combustion engine at the mid portion thereof and a driver's seat on an upper portion thereof.

2. Description of the Prior Art

In a prior art type device such as disclosed in Japanese Kokai Publication Sho No. 56-73694, for example, a saddle type vehicle is provided with a pair of rear wheels and a rear fender which is greatly extended in the lateral direction in order to cover the two rear wheels. It has been usual with this type of vehicle that the rear fender is formed in a curve with a downwardly bent front wall thereof located in front of the rear wheel on each side.

This conventional apparatus is defective in that air flowing from the front during the running of the vehicle is obstructed by the downwardly bent front wall of the rear fender and is thus prevented from flowing straight backwards along on each side wall surface of the vehicle body. As a result, heat generated from the engine is liable to stagnate or be accumulated in both lateral side space regions of the engine.

SUMMARY OF THE INVENTION

This invention has for its object to provide an apparatus for dissipating the engine heat which is accumulated in the prior art apparatus.

The present invention is directed to a fender apparatus for use with a saddle type vehicle having a vehicle body, an internal combustion engine mounted on the vehicle body, a driver's seat mounted on the vehicle body and a pair of rear wheels mounted on the vehicle body. The fender apparatus comprises a rear fender having a downwardly bent front wall located to the inside of the position of the rear wheel on each side of the vehicle body, such that air flows rearward past the engine and through the through openings to dissipate heat generated by the engine.

DETAILED DESCRIPTION OF THE PREFERRED EMBODIMENT

Figure 1:
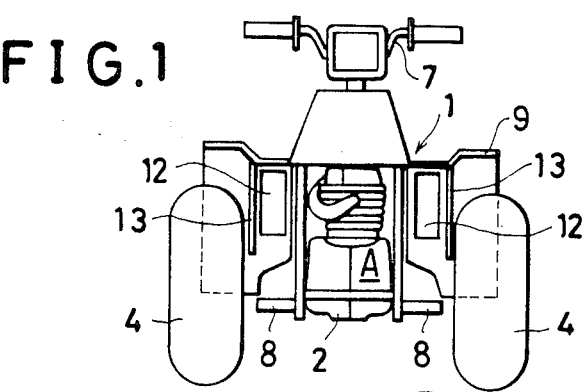
FIG. 1 is a front view of a saddle type vehicle having the preferred embodiment of the present invention.
Figure 2:
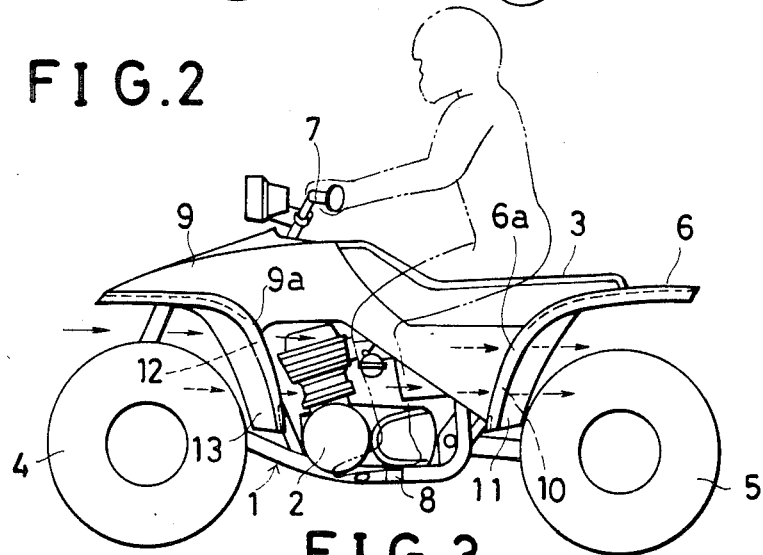
FIG. 2 is a side view thereof.
Figure 3:
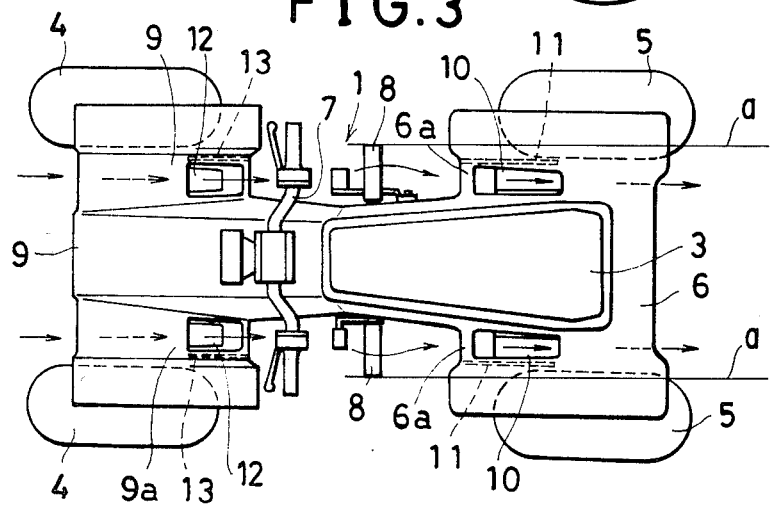
FIG. 3 is a top plan view thereof.

Referring to the drawings, a vehicle body 1 has at its middle portion an internal combustion engine 2 and at its upper portion a driver's seat 3. The vehicle body 1 is provided with a pair of front wheels 4 and a pair of rear wheels 5, thus forming a saddle type four-wheeled vehicle. The vehicle body 1 has a rear fender 6 which extends in the lateral direction to cover the two rear wheels 5 from a front part to an upper part of the outer periphery of the rear wheel 5 on each side.

The vehicle further includes a steering handle 7, a driver's step 8, and a front fender 9 which is large in width in order to cover the two front wheels 4 from an upper part to a rear part of the outer periphery of the front wheel 4 on each side.

According to the present invention, the downwardly bent front wall 6a of the rear fender 6 on each side of the vehicle body 1 is provided with a through opening 10 located to the inside of the position of the rear wheel 5 on each side of the body.

In the preferred embodiment, the through opening 10, in the front wall 6a on each side, is of a rectangular form with the length thereof extending upwards and downwards. Additionally, in the preferred embodiment, the rear fender 6 is provided, on a rear surface thereof, with a pair of longitudinally extending partition walls 11 each located between one of the through openings 10 and the rear wheels 5 so that air flowing from the front may pass through the through opening 10 on each side and in addition may be regulated by the wall 11 into a straightened laminar flow. Additionally, a foreign matter such as mud splashed upwards by the rear wheels 5 is prevented from flying forwards through the through opening 10.

When the vehicle has a pair of front wheels 4 as shown, a downwardly bent rear wall 9a of the front fender 9 is provided on each side thereof, with a through opening 12 located to the inside of the front wheel 4 when the vehicle is moving straight ahead so that the flowing air passes through each through opening 12 and flows towards the through openings 11.

Partition walls 13 are provided on a rear surface of the front fender 9 and are positioned between each of the through openings 12 and the corresponding front wheel 4 on each side.

Next, the operation of the foregoing apparatus will be explained as follows:

Due to the fact that the downwardly bent front wall 6a of each of the rear fenders 6 is provided with a through opening 10, the air flow from front is permitted to pass through each through opening 10 and flows to the rear without being obstructed by the front wall 6a. Thus a flow of air is created along on each side surface of the vehicle body 1, and consequently the heat generated from the engine does not stagnate or become accumulated in the lateral side space regions of the engine 2 but rather is dissipated by the flow of air passing rearwardly through the through openings 10. Additionally, an ejector action is created when the flowing air passes through the lateral side space portions of the engine 2, and as a result the heat around the engine 2 is carried therefrom.

In addition, due to such an arrangement in which the through opening 10 on each side is located to the inside of the rear wheel 5 on each side, the amount of splashed foreign matter which flies therethrough is very small, and if the partition wall 11 is provided as in the preferred embodiment, the prevention of flying splashed foreign matter through the through opening 10 can be ensured.

Thus, according to the present invention, the downwardly bent front wall of the rear fender is provided, on each side of the vehicle body, with a through opening located to the inside of the position of the rear wheel on each side. Thus, the air flowing from the front is permitted to pass through each through opening thereby creating flow of air passing along each side surface of the vehicle body, and the heat generated from the engine can be carried away rearwardly by the resultant air flow passing through the through opening on each side. Additionally, the heat around the engine can be effectively dissipated by the ejector action which is created, and thus the cooling function of the engine can be improved.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalance of the claims are, therefore, to be embraced therein.

I claim:

1. A fender apparatus for use with a saddle type vehicle having a vehicle body, an internal combustion engine mounted on the vehicle body at the mid portion thereof between front and rear wheels, a driver's seat mounted on the vehicle body at an upper portion thereof, a pair of rear wheels mounted on the vehicle body, and foot pedals adjacent said engine and disposed inside said rear wheels, each foot pedal having an outer end, the fender apparatus comprising a rear fender covering the two rear wheels, the rear fender having a downwardly bent front wall and a through opening in the bent front wall located laterally to the inside of the position of the rear wheel on each side of the vehicle body and laterally inside a plane parallel to a centerline of the vehicle body passing through the outer end of the respective foot pedal, and a longitudinally extending partition wall located between each through opening and the corresponding rear wheel on each side of the vehicle body wherein upon movement of the vehicle air flows rearward past the engine and through the through openings to dissipate heat generated by the engine and to cool the driver's feet and legs.

2. A fender apparatus for use with a saddle type vehicle having a vehicle body, an internal combustion engine mounted on the vehicle body at the mid portion thereof, a driver's seat mounted on the vehicle body at an upper portion thereof, and a pair of rear wheels mounted on the vehicle body, the fender apparatus comprising a rear fender covering the two rear wheels, the rear fender having a downwardly bent front wall and a through opening in the bent front wall located laterally to the inside of the position of the rear wheel on each side of the vehicle body, a front fender mounted on the vehicle body and extending over the front wheels of the vehicle, the front fender having a downwardly bent rear wall and a through opening in the downwardly bent rear wall located laterally to the inside of the position of the front wheels on each side of the vehicle body, wherein air flows through the through openings in the front fender towards the through openings in the rear fender.

* * * * *